United States Patent
Bajjuri et al.

(10) Patent No.: US 9,240,686 B2
(45) Date of Patent: Jan. 19, 2016

(54) BATTERY POWER MANAGEMENT SYSTEM

(75) Inventors: Pranay Kumar Bajjuri, Allen, TX (US); John Jacob, Fort Wayne, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 770 days.

(21) Appl. No.: 13/636,930

(22) PCT Filed: Mar. 25, 2010

(86) PCT No.: PCT/US2010/028613
§ 371 (c)(1),
(2), (4) Date: Sep. 24, 2012

(87) PCT Pub. No.: WO2011/119161
PCT Pub. Date: Sep. 29, 2011

(65) Prior Publication Data
US 2013/0009465 A1    Jan. 10, 2013

(51) Int. Cl.
| | |
|---|---|
| *B60L 1/00* | (2006.01) |
| *B60L 3/00* | (2006.01) |
| *H02G 3/00* | (2006.01) |
| *H02J 1/14* | (2006.01) |
| *B60L 11/18* | (2006.01) |
| *B60R 16/02* | (2006.01) |
| *B60R 16/03* | (2006.01) |
| *F02N 11/08* | (2006.01) |
| *H01M 10/48* | (2006.01) |
| *H02J 7/00* | (2006.01) |
| *H02J 9/00* | (2006.01) |

(52) U.S. Cl.
CPC .............. *H02J 1/14* (2013.01); *B60L 11/1861* (2013.01); *B60L 11/1872* (2013.01); *B60R 16/02* (2013.01); *B60R 16/03* (2013.01); *F02N 11/08* (2013.01); *H01M 10/48* (2013.01); *H02J 7/00* (2013.01); *H02J 9/002* (2013.01)

(58) Field of Classification Search
CPC ........... H02J 1/14; H02J 7/00; B60L 11/1872; B60L 11/1861
USPC ......................................................... 307/9.1
See application file for complete search history.

(56) References Cited

U.S. PATENT DOCUMENTS

| 4,200,080 A | 4/1980 | Cook et al. |
|---|---|---|
| 4,799,126 A | 1/1989 | Kruse et al. |

(Continued)

*Primary Examiner* — Carlos Amaya
(74) *Attorney, Agent, or Firm* — Jeffrey P. Calfa; Mark C. Bach

(57) ABSTRACT

The loads of a vehicle electrical system are connected to a power distribution bus through a first or through first and second latching relays. A set of vehicle mandatory loads are connected to an output side of the first latching relay to be cut off from the power distribution bus upon opening of the first latching relay. A set of vehicle optional loads are connected to an output side of the second latching relay to be cut off from the power distribution bus upon opening of the first latching relay or the second latching relay. Opening and closing of the first and second latching relays depends of the values for the measured current and measured voltage. Among factors relating to opening and closing of the first and second latching relays are measured voltage exceeding a voltage high threshold, in which case the first latching relay opens, measured voltage falling below a low voltage threshold in which case the second latching relay opens while the first latching relay remains closed and a positive current transient exceeding a minimum threshold, which opens the first latching relay.

8 Claims, 1 Drawing Sheet

(56) References Cited

U.S. PATENT DOCUMENTS

| | | |
|---|---|---|
| 4,845,465 A | 7/1989 | Kruse et al. |
| 5,204,992 A | 4/1993 | Carpenter |
| 5,321,389 A | 6/1994 | Meister |
| 5,381,295 A | 1/1995 | Rund et al. |
| 6,272,402 B1 | 8/2001 | Kelwaski |
| 6,690,140 B2 | 2/2004 | Larson |
| 6,724,102 B1 | 4/2004 | Kelwaski et al. |
| 6,768,221 B2 | 7/2004 | Klinger et al. |
| 6,836,094 B1 | 12/2004 | Bender |
| 6,841,895 B1 | 1/2005 | Kelwaski et al. |
| 7,421,323 B2 | 9/2008 | Dannenberg et al. |
| 7,612,524 B2 | 11/2009 | Howell et al. |
| 7,728,457 B2 | 6/2010 | Carnevale |
| 8,026,632 B2 | 9/2011 | Cook et al. |
| 8,169,104 B2 | 5/2012 | Cunningham et al. |
| 8,207,633 B2 | 6/2012 | Oleksiewicz |
| 8,258,651 B2 | 9/2012 | Duan et al. |
| 2003/0080621 A1* | 5/2003 | Kirk ............... H02H 3/087 307/10.7 |
| 2004/0019441 A1 | 1/2004 | Larson et al. |
| 2004/0113494 A1 | 6/2004 | Karuppana et al. |
| 2005/0141154 A1 | 6/2005 | Consadori et al. |
| 2008/0221755 A1* | 9/2008 | Senda ............... H02J 7/1438 701/36 |
| 2009/0108814 A1 | 4/2009 | Wilkins et al. |
| 2009/0147427 A1 | 6/2009 | Levinas et al. |
| 2009/0248228 A1 | 10/2009 | Miller et al. |

* cited by examiner

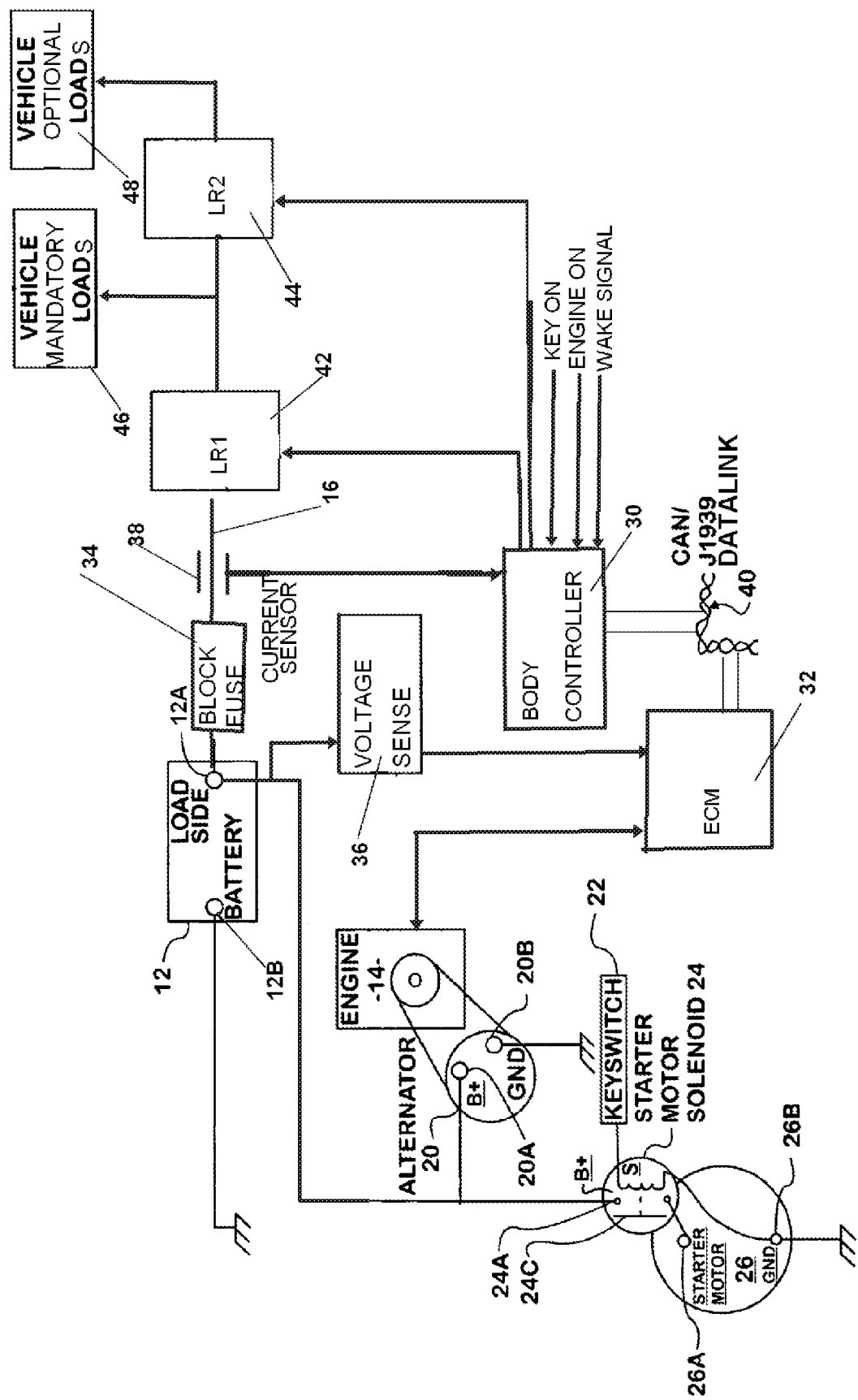

BATTERY POWER MANAGEMENT SYSTEM

BACKGROUND

1. Technical Field

The technical field relates generally to selective load shedding in response to conditions monitored at the output terminals of a vehicle chassis battery.

2. Description of the Problem

Electrical systems for internal combustion engine based motor vehicles include loads, alternators for generating electricity, rechargeable batteries for storing electrical power potential in chemical form and distribution wiring including power buses. Loads and the batteries are subject to damage under certain conditions. For example, batteries should help regulate the vehicle electrical system voltage. However, alternator voltage regulators can fail resulting in excessively high voltage transients on distribution wiring. Such voltages can reduce the expected service life of loads such as light bulbs. Sustained operation of loads from the battery alone reduce a battery's state of charge, which is reflected in a reduced output voltage. A low state of charge may result in an excessively high rate of charging when the vehicle is restarted shortening the battery's service life and a low state of charge can compromise the ability of the battery to support engine cranking for starting. A current surge from the battery may indicate a short circuit which can rapidly reduce the battery's state of charge.

SUMMARY

A motor vehicle electrical power management system includes an internal combustion engine and an alternator coupled to the internal combustion engine as a base electrical power supply. A chassis battery is charged by the alternator and provides voltage regulating functions during operation of the engine for a power distribution system which is distributes power from the alternator and the battery. Current through and on voltage on the power distribution system are monitored. Loads are connected to the power distribution bus through a first or through first and second latching relays. A set of vehicle mandatory loads are connected to an output side of the first latching relay to be cut off from the power distribution bus upon opening of the first latching relay. A set of vehicle optional loads are connected to an output side of the second latching relay to be cut off from the power distribution bus upon opening of the first latching relay or the second latching relay. Opening and closing of the first and second latching relays depends of the values for the measured current and measured voltage. Among factors relating to opening and closing of the first and second latching relays are measured voltage exceeding a voltage high threshold, in which case the first latching relay opens, measured voltage falling below a low voltage threshold in which case the second latching relay opens while the first latching relay remains closed and a positive current transient exceeding a minimum threshold, which opens the first latching relay.

BRIEF DESCRIPTION OF THE DRAWINGS

FIG. 1 is a high level schematic of a vehicle electrical power generation, storage and distribution system.

DETAILED DESCRIPTION

Referring to FIG. 1, a high level schematic of a vehicle electrical power system 10 is illustrated. The vehicle electrical power system 10 chosen to illustrate a possible environment of application of the management system taught in this patent document includes chassis battery 12, an alternator 20, a starter motor 26, a starter motor solenoid 24 and vehicle mandatory and optional loads 46, 48. Chassis battery 12 provides electrical power from its positive terminal 12A to support cranking of thermal engine 14 by starter motor 26 and, when thermal engine 14 is off and power is not available from alternator 20, can be used to supply power to vehicle mandatory and optional loads 46, 48. Alternator 20, which is driven by a thermal engine 14, the vehicle's prime mover, is connected by its output terminal 20A to positive terminal 12A of chassis battery 12 to serve as an electrical power source for maintaining the state of charge of a chassis battery 12. When chassis battery 12 has a full state of charge and engine 12 is running alternator 20 supplies power over a power bus 16 to vehicle mandatory and optional loads 46, 48 with battery 12 providing supplementary voltage regulation functions and to supply power during periods when engine 14 output is low. Chassis battery 12 and alternator 20 are connected to a common chassis ground by their negative terminals 12B and 20B, respectively. A power bus 16 is connected to positive terminal 12A of battery 12 through a block fuse 34. A vehicle electrical system may include more than one power bus.

The categorization of electrical system loads into first and second sets of vehicle mandatory and optional loads 46, 48 on power bus 16 reflects how dispensable a given load is for vehicle operation and thus reflects the relative priority of the loads for shedding based on measured values of variables at the battery positive terminal 12A of chassis battery 12. Some loads fall outside of this categorization, such as starter motor solenoid 24 and starter motor 26, which have fully protected access to whatever power is available from chassis battery 12 by virtue of the direct connection between terminal 24A of the starter motor solenoid 24 and the battery positive terminal 12A of battery 12. Battery positive terminal 12A is directly connected through starter motor solenoid 24 to starter motor 26 upon rotation of keyswitch 22 to the start position.

Contemporary vehicles are commonly equipped with electronic control systems elements of which are represented in the FIGURE. An engine control module (ECM) 32 provides control over timing of fuel injection to engine 14 and monitors a number of operating variables relating to engine operation such as angular velocity (tachometer signal), oil pressure, etc., which allow ECM 32 to generate an engine ON signal. ECM 32 is illustrated as connected to a voltage sensor 36 which monitors the voltage on battery positive terminal 12A of chassis battery 12. The engine ON signal and chassis battery voltage can be broadcast over an SAE J1939 compliant serial datalink 40 which is part of a controller area network (CAN). A key ON signal depends upon the position of keyswitch 22, which can be applied directly to a body controller 30. A wake signal can come from a body controller 30 timer or any other controller in response to an input calling for a change in vehicle state. Body controller 30 is a further electronic control system element which can be programmed to use the engine ON signal and chassis battery voltage signal whether received over the serial datalink 40 or applied directly to the body controller 30. Body controller 30 is further connected to a Hall Effect current sensor 38 which measures current flowing out of battery positive terminal 12A to vehicle mandatory and optional loads 46, 48. The distribution of functions between ECM 32 and body controller 30 is for example only, more or fewer of the functions described could be located in a particular controller, however, generally, the ECM 32 will be the source of an engine ON signal and a body controller 30 provides switches for control over the operation of devices such as lamps and these switches can be readily employed for the control of latching relays (LR1 and LR2) 42, 44.

Vehicle mandatory loads 46 are connected to battery positive terminal 12A of chassis battery 12 through a block fuse 34 and a first latching relay 42 (LR1). Vehicle optional loads are connected to battery positive terminal 12A through block fuse 34, first latching relay 42 and a second latching relay 44 (LR2). The opening and closing of first and second latching relays 42, 44 is under the control of body controller 30. Body controller opens and closes the first and second latching relays 42, 44 in response to sensed voltage on battery positive terminal 12A, current flow (and changes in current flow over time) out of battery positive terminal 12A and variables relating to the state of the vehicle including keyswitch 22 position, the engine ON signal and a wake signal.

If the body controller 30 detects or receives indication that the sensed voltage ($V_{sense}$) on battery positive terminal 12A is less than the low set point voltage (VL) the body controller 30 opens the second latching relay 44 disconnecting all the vehicle optional loads 48 from positive terminal 12A. Among other results, this slows the discharge of chassis battery 12 under condition where it is being continuously drained. This situation can arise where vehicle optional loads 48 are in use and the engine 14 has been idling for a prolonged period. Idling time is limited on contemporary diesel engine equipped commercial vehicles.

If the body controller 30 detects or receives indication that $V_{sense}$ is greater than a high set point voltage (VH, a high voltage fault condition), the body controller opens first latching relay 42 disconnecting both the vehicle mandatory loads 46 and the vehicle optional loads 48 from chassis battery 12. The application of higher than rated voltages to vehicle electrical components can shorten their service lives and cutting loads off from high voltages thus protects the constituent components of vehicle mandatory and optional loads 46, 48 from damage which can result from the application of power at excessive voltages.

If the body controller 30 detects a sudden rise in the current sourced from battery positive terminal 12A ($\Delta I/\Delta T$>Limit) a short circuit condition is inferred and the body controller 30 opens first latching relay 42, cutting off the vehicle mandatory and optional loads 46, 48. This protects chassis battery 12 from discharge due to the potential short circuit and possibly extends protection to loads wherein the possible short circuit has occurred.

When the engine is cranked, the body controller 30 detects the event and opens first latching relay 42 to divert current to the starter motor 26 for a proper crank operation. This can improve starter motor 26 reliability.

When the vehicle is turned OFF and parked the body controller 30 opens first latching relay 42 and thereby disconnects all the loads that are powered through it. This reduces quiescent current draw from the chassis battery 12 and prevents loss of power when the vehicle is in standby mode. This reduces long term effects on chassis battery 12 service life due to the effects of deep discharge.

The following table recapitulates system functionality:

| Condition | Function | Current | Voltage | LR1 State | LR2 State |
|---|---|---|---|---|---|
| Engine Off (No Idle Mode) | Body Cont. monitors Chassis Battery Voltage | NA | $V_{sense}$ | Closed | Closed |
| Low Voltage | Loads Shed | NA | <VL | Closed | Open |
| High Voltage | High Voltage Prot | NA | >VH | Open | NA |
| High Current | Over Current Prot | $\Delta I/\Delta T$ > Limit | NA | Open | NA |
| Cranking | Current Diversion | NA | NA | Open | NA |
| Key Off | Reduce Quiescent Current | NA | NA | Open | NA |
| Engine ON | Normal Monitoring | | | Closed | Closed |

Latching relays can serve the function of a fuse with current sense capabilities. They can be used as a replacement to the mega fuses for power distribution. The voltage and current feedback data can be used in analyzing the battery performance and for diagnosing failure modes for chassis battery 12.

Representative loads available for inclusion among vehicle mandatory loads 46 for power bus 16 and connected through the first latching relay 42, could include electrical system elements such as an: instrument cluster (backlights); a secondary gauge cluster; engine control module 32; vehicle entertainment electronics; a cab heating, and ventilation and air conditioning controller (HVAC). These are elements which consume current from the chassis battery 12 in key off state, but are not needed when the vehicle is off. Another power bus can be available for systems that require power when the vehicle is off.

Representative loads available for inclusion among vehicle optional loads 48 and connected to receive power through the second latching relay 44 could include vehicle systems such as: a sleeper HVAC controller; a sleeper DC/AC inverter; sleeper dome lamp, accent lighting, bunk lamp, cab floor lamp, etc.; and sleeper HVAC motors.

What is claimed is:

1. A vehicle electrical system, comprising:
   a battery having first and second terminals;
   a power distribution bus connected to the first terminal of the battery;
   a voltage sensor connected with respect to the first terminal of the battery to measure voltage on the first terminal;
   a current sensor located with respect to the power distribution bus to measure current out of the first terminal into the power distribution bus;
   a first set of loads drawing current from the power distribution bus;
   a second set of loads drawing current from the power distribution bus;
   a first latching relay connected into the power distribution bus between the first terminal and the first and second sets of loads which may be opened to cut off the first and second set of loads from power;
   a second latching relay connected into the power distribution bus between the first latching relay and the second set of loads which may be opened to cut off the second set of loads from power;
   means responsive to measured voltage and changes in measured current for opening either of the first and second latching relays;
   a source of electrical power connected to the first terminal;
   a vehicle prime mover coupled to drive the source of electrical power;

a starter motor including a starter motor solenoid for a vehicle prime mover connected to the first terminal for energization;

a keyswitch having a plurality of positions connected to the starter motor solenoid for engaging the starter motor for cranking the vehicle prime mover; and the means for opening further comprising:

a body controller connected to receive the measured voltage signal, the measured current signal and a keyswitch position signal;

an engine control module for generating an engine on signal for the vehicle prime mover; and a datalink connecting the engine control module and the body controller over which the engine on signal is transmitted.

2. The vehicle electrical system of claim 1 wherein the communication link and the body controller operates as a controller area network.

3. The vehicle electrical system of claim 2 wherein the vehicle prime mover is an internal combustion engine.

4. A motor vehicle electrical power management system, comprising:

an internal combustion engine;

an alternator having an output terminal coupled to the internal combustion engine to generate electrical power;

a chassis battery having an output terminal, the output terminal of the battery being connected to the output terminal of the alternator;

a power distribution bus connected to the output terminal of the chassis battery;

a voltage sensor for measuring voltage on the output terminal of the chassis battery;

a current sensor for measuring current on the power distribution bus out of the output terminal of the chassis battery;

a first latching relay and a second latching relay connected in series on the power distribution bus;

a set of vehicle mandatory loads connected to an output side of the first latching relay to be cut off from the power distribution bus upon opening of the first latching relay;

a set of vehicle optional loads connected to an output side of the second latching relay to be cut off from the power distribution bus upon opening of the first latching relay or the second latching relay; and a body controller responsive the measured voltage and the measured current for selectively opening at least one of the first latching relay and the second latching relay wherein the body controller is responsive to measured voltage exceeding a voltage high threshold for opening the first latching relay, is further responsive to the measured voltage falling below a low voltage threshold for opening the second latching relay while leaving the first latching relay closed and is still further responsive to positive current transients exceeding a minimum threshold for opening the first latching relay.

5. The motor vehicle electrical power management system of claim 4, further comprising:

a starter motor for the internal combustion engine; and the body controller being responsive to cranking of the internal combustion engine using the starter motor for opening the first latching relay.

6. The motor vehicle electrical power management system of claim 5, further comprising:

a serial datalink;

an engine control module connected to the serial datalink for broadcasting condition signals thereon, the engine control module providing an engine on signal over the serial datalink; and the body controller being connected to the serial datalink and being further responsive to the engine on signal for monitoring for changes in measured voltage and measured current.

7. A motor vehicle electrical power management system as set forth in claim 6, further comprising:

a keyswitch having a plurality of positions including on and off, the positions being communicated to the body controller; and the body controller being further responsive to the engine being off while the keyswitch is on for monitoring measured voltage for opening the second latching relay.

8. A motor vehicle electrical power management system as set forth in claim 7 wherein the serial datalink is part of a controller area network.

* * * * *